United States Patent [19]

Harada et al.

[11] Patent Number: 5,409,775

[45] Date of Patent: Apr. 25, 1995

[54] VAPOR-GROWN AND GRAPHITIZED CARBON FIBERS, PROCESS FOR PREPARING SAME, MOLDED MEMBERS THEREOF, AND COMPOSITE MEMBERS THEREOF

[75] Inventors: Minoru Harada; Masanori Niiyama, both of Shizuoka, Japan

[73] Assignee: Nikkiso Company Limited, Tokyo, Japan

[21] Appl. No.: 85,940

[22] Filed: Jul. 6, 1993

[30] Foreign Application Priority Data

Jul. 6, 1992 [JP] Japan .................................. 4-178687

[51] Int. Cl.⁶ ............................................ B32B 9/00
[52] U.S. Cl. ........................... 428/367; 428/359; 423/447.1; 423/447.3; 423/447.6
[58] Field of Search ..................... 428/367, 368; 423/447.1, 447.3, 447.4, 447.5, 447.6

[56] References Cited

U.S. PATENT DOCUMENTS

| | | | |
|---|---|---|---|
| 4,518,575 | 5/1985 | Porter et al. | 423/447.3 |
| 4,572,813 | 2/1986 | Arakawa | 423/447.3 |
| 4,876,078 | 10/1989 | Arakawa et al. | 423/447.3 |
| 5,165,909 | 11/1992 | Tennent et al. | 423/447.1 |
| 5,171,489 | 12/1992 | Hirao et al. | 264/12 |
| 5,171,560 | 12/1992 | Tennent | 428/367 |
| 5,210,116 | 5/1993 | Hashimoto et al. | 423/447.3 |

FOREIGN PATENT DOCUMENTS

| | | |
|---|---|---|
| 0433507 | 12/1989 | European Pat. Off. . |
| 107320 | 8/1977 | Japan . |
| 117622 | 7/1982 | Japan . |
| 156512 | 9/1983 | Japan . |
| 180615 | 10/1983 | Japan . |
| 185818 | 9/1985 | Japan . |
| 224815 | 11/1985 | Japan . |
| 231821 | 11/1985 | Japan . |
| 132600 | 6/1986 | Japan . |
| 132630 | 6/1986 | Japan . |
| 132663 | 6/1986 | Japan . |
| 225319 | 10/1986 | Japan . |
| 225322 | 10/1986 | Japan . |
| 225325 | 10/1986 | Japan . |
| 225327 | 10/1986 | Japan . |
| 225328 | 10/1986 | Japan . |
| 227425 | 10/1986 | Japan . |
| 282427 | 12/1986 | Japan . |

OTHER PUBLICATIONS

American Institute of Physics, "Electron-spin-resonance studies of vapor-grown carbon fibers", Journal of Applied Physics, vol. 62, No. 9, pp. 3947–3952, Nov. 1, 1987.

Primary Examiner—Patrick J. Ryan
Assistant Examiner—J. M. Gray
Attorney, Agent, or Firm—Browdy and Neimark

[57] ABSTRACT

There are disclosed vapor-grown and graphitized carbon fibers capable of forming composite materials having the vapor-grown and graphitized carbon fibers contained at a high packing density and forming molded members consisting substantially solely of the vapor-grown and graphitized carbon fibers, a process for the preparation of the vapor-grown and graphitized carbon fibers, the molded member, and the composite member. The vapor-grown and graphitized carbon fibers have a mean fiber diameter of 5 μm or smaller, a mean fiber length of 90 μm or shorter, a mean aspect ratio of from 1 to 18, and a spin density of $8 \times 10^{18}$ spins/g or less, when measured by the electron spin resonance absorption method. Such vapor-grown graphitized carbon fibers are prepared by graphitizing the vapor-grown carbon fibers at 2,000° C. or higher and then fracturing them by applying a high impact thereto. The molded members can be formed, for example, by hydrostatic pressure-isotropic pressure molding techniques, The composite members can be prepared by compounding the vapor-grown and graphitized carbon fibers with the matrix.

12 Claims, 1 Drawing Sheet

VAPOR-GROWN AND GRAPHITIZED CARBON FIBERS, PROCESS FOR PREPARING SAME, MOLDED MEMBERS THEREOF, AND COMPOSITE MEMBERS THEREOF

TECHNICAL FIELD

The present invention relates to vapor-grown and graphitized carbon fibers, a process for the preparation of the carbon fibers grown in a vapor phase and then graphitized, molded members of the vapor-grown and graphitized carbon fibers, and composite members thereof. More particularly, the present invention relates to vapor-grown and graphitized carbon fibers suitable for composite members such as composite materials, composite molded members or the like, or molded members formed substantially solely with the vapor-grown and graphitized carbon fibers, a process for the preparation of the vapor-grown and graphitized carbon fibers, the molded members thereof comprising solely or substantially solely of the vapor-grown and graphitized carbon fibers, and composite members comprising the vapor-grown and graphitized carbonfibers and a matrix.

BACKGROUND ART

Carbon fibers grown in a vapor phase which may be said to be vapor-grown carbon fibers can be prepared by subjecting a carbon compound to pyrolysis at temperature ranging from 800° C. to 1,300° C. in the presence of a catalyst comprising iron or nickel in the superfine particle form. The resulting vapor-grown carbon fibers then can readily be converted into -the carbon fibers having a graphite structure by heating the vapor-grown carbon fibers. For example, when the vapor-grown carbon fibers are heated at temperature higher than 2,800° C. to form vapor-grown and graphitized carbon fibers, crystal lattice planes of graphitized carbon fibers, having little defect in crystalline order, grow in the direction parallel to the fiber axis and form of an annual ring. Hence, the carbon fibers grown in the vapor phase and then graphitized can offer the characteristics that they have a high degree of physical strength and elastic modulus and that they are highly conductive thermally and electrically.

It is thus greatly expected that the vapor-grown and graphitized carbon fibers can provide composite materials having excellent properties. With this expectation, extensive review has been made with the attempt to develop molded members containing such vapor-grown and graphitized carbon fibers at a high packing density and consisting substantially solely of such carbon fibers.

As a result of such extensive review, however, it has been found difficult to form such molded members consisting substantially solely of such vapor-grown and graphitized carbon fibers and containing them at a high packing density. This difficulty may be assumed to reside in the matter that, when the vapor-grown and graphitized carbon fibers are mixed with another material to thereby form a composite material, there are employed the vapor-grown and graphitized carbon fibers that are prepared by adjusting the vapor-grown carbon fibers with a means Such as a ball mill or the like so as to have an appropriate fiber length, for example, having an aspect ratio of 100 or lower in order to prevent the carbon fibers from uneven dispersion, and then by subjecting the resulting carbon fibers to graphitization. The vapor-grown and graphitized carbon fibers so prepared are less defective in a crystalline structure so that they are less wettable with other materials and high in elastic modulus. Hence, the shape of molded member of vapor-grown and graphitized carbon fibers cannot be sustained when molded members are to be formed substantially solely with vapor-grown and graphitized carbon fibers for its high packing density. Further, the resulting molded members become: very fragile even if the shapes Of the vapor-grown and graphitized carbon fibers could be sustained.

On the other hand, extensive review has recently been made with the attempt to develop a lithium ion secondary battery that uses carbon as an active substance for an electrode.

Although a lithium secondary battery has drawn attention due to its high energy density, there is the risk that may be caused to occur if its electrode is not sealed in a complete way because metallic lithium that is highly active to oxygen and moisture is employed for the electrode. Further, it can suffer from the disadvantage that the electrodes are short-circuited due to the formation of needle-like crystals of lithium, i.e. dendrite, on the surface of the lithium electrode. Hence, a growing interest has been shifted to the lithium ion secondary battery which uses as the electrode a carbon that can form an intercalation compound with the lithium ions, because such as lithium ion secondary battery does not cause those risks and disadvantages, even if the lithium ion secondary battery should sacrifice some degree of energy density.

Among the carbon-lithium ion intercalation compounds, the compound that contains a largest amount of lithium ions is a compound of first stage and the ratio of carbon atoms to lithium atoms is six to one (6:1). If all the carbons are used for producing intercalation compounds and all the lithium atoms intercalated on a charging process are fully de-intercalated on the discharging, the quantity of electricity that can be discharged is a maximum of 372 mA hour per gram of carbon. Although a variety of efforts have been made so far to attain the theoretical quantity of dischargeable electricity, however, no compound of first stage having a satisfactorily high quantity of electricity discharge capability is found yet.

DISCLOSURE OF INVENTION

The present invention has been completed on the basis of the technical art as described hereinabove and the finding so far made as well as the inventor's assumption.

The primary object of the present invention is to provide vapor-grown and graphitized carbon fibers capable of formulating composite members such as composite materials consisting substantially solely of the vapor-grown and graphitized carbon fibers, composite molded members, or the like.

Another object of the present invention is to provide a process for the preparation of the vapor-grown and graphitized carbon fibers.

A further object of the present invention is to provide molded members having the vapor-grown and graphitized carbon fibers contained at a high packing density.

A still further object of the present invention is to provide composite members containing the vapor-grown and graphitized carbon fibers.

In order to achieve the objects as described hereinabove, the present invention consists of the vapor-grown and graphitized carbon fibers characterized by carbon fibers grown in the vapor phase and graphitized, which have a mean fiber diameter of 5 μm or smaller, a mean fiber length of 90 μm or shorter a mean aspect ratio of from 1 to 18, and a spin density of $8 \times 10^{18}$ spins/g or less, when measured by the electron spin resonance absorption method.

The present invention further consists of the process for the preparation of the vapor-grown and graphitized carbon fibers, which is characterized by subjecting vapor-grown carbon fibers, which are not fractured to a substantial extent, to graphitization by heating them at temperature of 2,000° C. or higher and then by fracturing the resulting vapor-grown and graphitized carbon fibers under high impact so as to provide vapor-phase and graphitized carbon fibers having a spin density of $8 \times 10^{18}$ spins/g or less, when measured by the electron spin resonance absorption method.

The present invention additionally consists of the molded members consisting substantially solely of the vapor-grown and graphitized carbon fibers.

Furthermore, the present invention consists of the composite members comprising of the vapor-grown and graphitized carbon fibers and a matrix.

Figure 1:
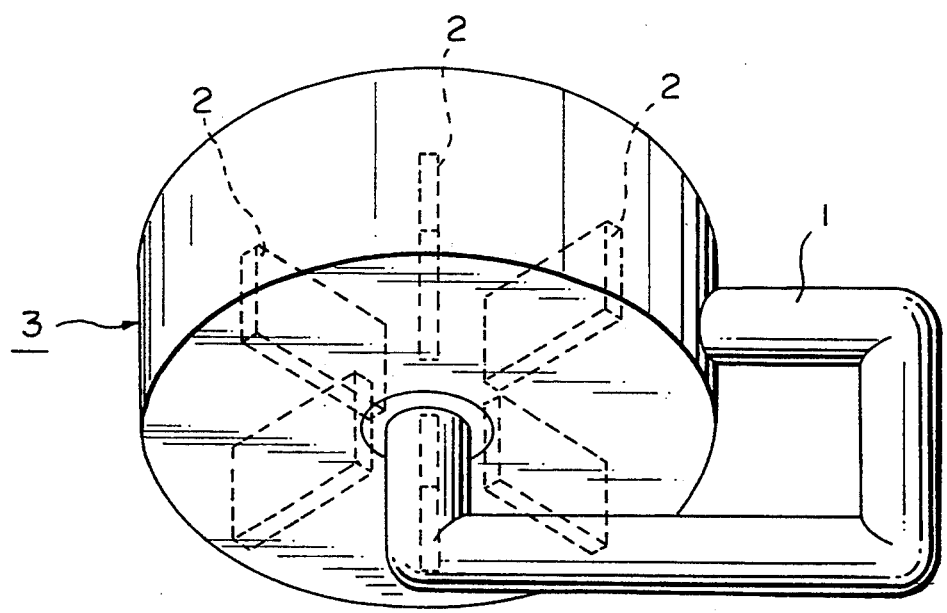
FIG. 1 is a schematic representation showing the structure of an example of a high-impact treatment apparatus so adapted as to be employed appropriately for the process according to the present invention.

BEST MODE FOR CARRYING OUT THE INVENTION a. Vapor-Grown and Graphitized Carbon Fibers Vapor-grown and graphitized carbon fibers may also be abbreviated to VGCF in this specification.

The VGCF according to the present invention have a mean fiber diameter of 5 μm or smaller, preferably from 0.1 μm to 3 μm, and more preferably from 0.3 μm to 2 μm; a mean fiber length of 90 μm, or shorter; and a mean aspect ratio of from 1 to 18, preferably from 2 to 16, more preferably from 5 to 15. The VGCF having such characteristics can be used to form molded members and composite members with high packing density.

Alternatively, it is preferable that the VGCF have a mean fiber diameter of from 1.5 μm to 3.0 μm with a view to retaining high charge volume of negative electrode in a secondary battery. When a mean fiber diameter of VGCF is smaller than 1.5 μm, charge volume of negative electrode in a second battery becomes small and when a mean fiber diameter of VGCF is larger than 3.0 μm, the shape of the electrode becomes degradative and the electrode had a reduced characteristic of cycle of charge and discharge.

When the mean aspect ratio of the VGCF exceeds 18, no composite molded members having good properties are prepared.

The VGCF according to the present invention have a spin density of $8 \times 10^{18}$ spins/g or less, preferably $7 \times 10^{18}$ spins/g or less, when measured by the electron spin resonance absorption method.

When the spin density of the VGCF according to the present invention exists within the range as described hereinabove, the resulting carbon fibers can be used to produce a coating layer or a molded product retentive of its shape and can be used as a material having high amount of discharge. Therefore the carbon fibers can be used in an electrode of a battery in the form of intercalation compounds with lithium ion.

The VGCF according to the present invention have the interplanar distance ($d_{002}$) of the graphite lattice which may be usually 3.45 Å or shorter, preferably from 3.35 Å to 3.42 Å, more preferably from 3.35 Å to 3.37 Å, and the thickness of the graphite lattice plane in the condensed benzene ring form, that is, the thickness ($L_c$) of the laminated lattices in the crystal which may be usually 30 Å or thicker, preferably 300 Å or thicker, more preferably 1,000 Å or thicker, when considered from the point of view of that highly developed graphitization contributes to form good retention of shape of molded members made by VGCF, good formation of intercalation compound made by VGCF and lithium, good formation of molded members having highly conductive electrically, and good composite members forming thin layer and having large strength and highly conductive thermally and electrically.

The VGCF according to the present invention may be appropriately employed for the preparation of the composite members, such as the composite materials, the composite molded members, and so on. The composite materials may be prepared by compounding the VGCF with a plastic material, a rubbery material, a metallic material, a ceramic material, a paint, an adhesives, or the like with a high packing density. The composite molded members consisting solely or substantially solely of the VGCF may be prepared by compounding a large quantity of the VGCF with the possible smallest amount of a binder, if necessary. The composite materials and the composite molded members may be used as highly electrically conductive materials, highly thermally conductive materials, carriers for catalysts, and so on.

b. Process for the Preparation of the VGCF

The VGCF according to the present invention, that is, the VGCF suitable for the composite materials, can be prepared by the procedures of the process according to the present invention as will be described hereinafter in more detail.

More specifically, the VGCF can be prepared by heating the vapor-grown carbon fibers at temperature of, for example, 2,000° C. or higher and then by subjecting the vapor-grown carbon fibers to graphitization, followed by fracturing the resulting vapor-grown and graphitized carbon fibers at a high impact. The vapor-grown and graphitized carbon fiber may be referred to pre-VGCF to distinguish from VGCF of present invention.

The vapor-grown carbon fibers can be prepared by the vapor phase method as will be described hereinafter. The vapor phase method as applied to the formation of the vapor-grown carbon fibers of the present invention may include a so-called substrate method, i.e. the method for the growth of carbon fibers on a substrate and a so-called fluidized growth method, i.e. the method for the growth of carbon fibers in a fluidized flow. The substrate method involves flowing a hydrocarbon gas as a carbon-source gas over a base with a metal catalyst such as a transition metal or a transition metal compound deposited thereon in a high temperature furnace, thereby depositing carbon fibers on the surface of the substrate. The fluidized growth method involves flowing a mixture of a metallic compound, serving as a catalyst metal, and a carbon compound, serving as a carbon source, in a vapor phase through a reactor tube heated at high temperature, without the use of any base, thereby forming carbon fibers in the flowing gas in the reactor furnace.

Specifically, the vapor-grown carbon fibers can be used as a raw material for the process according to the present invention, which can be prepared by processes disclosed, for example, in Japanese Patent Unexamined Publication (kokai) Nos. 52-107,320, 57-117,622, 58-156,512, 58-180,615, 60-185,818, 60-224,815, 60-231,821, 61-132,600, 61-132,630, 61-132,663, 61-225,319, 61-225,322, 61-225,325, 61-225,327, 61-225,328, 61-227,425, and 61-282,427.

The vapor-grown carbon fibers to be employed for the process according to the present invention can then be treated by graphitization that involves heating them at temperature of approximately 2,000° C. or higher to thereby yield the pre-VGCF.

The graphitization may usually be carried out in an atmosphere in which an inert gas, for example nitrogen, helium, argon and so on, is present. The time required for the graphitization may be usually five minutes or longer.

In accordance with the process of the present invention, the pre-VGCF prepared in the manner as described hereinabove are then treated by fracturing them at a high impact to form VGCF.

It can be noted that, generally, when the molded members and the composite members are prepared from the VGCF, it is necessary that to fracture the pre-VGCF having their original length as grown after graphitization, because it is difficult to mix pre-VGCF with other components homogeneously. In this case, in order to allow the graphitization to be carried out in an efficient way, the pre-VGCF are usually fractured prior to the graphitization to reduce the bulkiness of the carbon fibers.

It has been found by the present inventors, however, that there is a great difference between the VGCF prepared by carrying out the fracture treatment prior to graphitization as in the conventional method and VGCF prepared by carrying out the fracture treatment after graphitization as in the present invention. The reason for creating that great difference is not yet clarified.

It is further found that, when the pre-VGCF are fractured at a high impact prior to the graphitization, the resulting VGCF has a high spin density at g=2.015 in the electron spin resonance (ESR). It can be noted herein that the g value of 2.015 corresponds to the oxygen radical.

On the other hand, it is found that, when the pre-VGCF are not caused to be fractured to a substantial extent prior to the graphitization and they are fractured at a high impact after the graphitization, as in the present invention, the spin density can be reduced, thereby improving the physical properties of the resulting molded members and composite members.

From the finding as described hereinabove, the process for the preparation of the VGCF according to the present invention comprises fracturing the pre-VGCF by applying the high impact thereto.

The methods for milling and crushing, such as ball mill, roller mill or the like, are generally adopted in order to make finely divided particles of materials further smaller. The ball mill, roll mill or such other procedures, however, may grind or crush the pre-VGCF to such an extent that a portion of the VGCF cannot sustain their fibrous shapes any more and it is difficult to control the ball mill, roll mill or such other procedures so as to make the fiber length a desired value. Further, these milling processes require a longer time for treatment.

On the other hand, it is preferred that the process according to the present invention is carried out by fracturing the pre-VGCF solely by applying the high impact thereto. The process according to the present invention can conveniently adjust the VGCF within a treatment time as short as several minutes so as to have a mean fiber length and so on, as defined by the present invention.

More specifically, an example of the treatment for fracturing the pre-VGCF involves applying the high impact to the pre-VGCF through the high-impact treatment apparatus as shown in FIG. 1. The high-impact treatment apparatus comprises a cylindrical container 3 having a plurality of impact blades 2 arranged radially so as to be rotatable and a self-circulation path 1 having one end mounted to a peripheral side of the cylindrical container 3 and having the other end mounted to a central portion of a flat plate of container 3 so as to form a passage for air flow. The high-impact treatment apparatus may allow the pre-VGCF to be placed therein and to apply the high impact to the pre-VGCF by rotating the impact blades 2 at a high speed.

The fiber length of the VGCF can be adjusted mainly by changing the power of the high impact in the treatment by applying the high impact to the pre-VGCF. The high impact can be applied by rotating the impact blades of the high-impact treatment apparatus although it is also possible to strike the pre-VGCF against the blades or against the inner peripheral wall of the cylindrical container in a one direction or in reciprocating directions. The rotation of the impact blades is preferred because it is easier in operations than the other procedures. The application of the high impact to the pre-VGCF allows the fibers to be cut or fractured at two occasions: at the first occasion when the fibers are caused to be struck to the impact blades and at the second occasion when they are caused to be struck to the inner peripheral wall of the container.

The conditions for applying the high impact to the pre-VGCF may vary greatly with the kind of the high-impact treatment apparatus or the like. In other words, the various conditions can conveniently be chosen to thereby have the pre-VGCF ground or fractured so as to make the VGCF have a spin density of $8 \times 10^{18}$ spins/g or less, when measured by the electron spin resonance absorption method.

Although the velocity of rotation of the impact blades applying the high impact to the pre-VGCF (or the velocity at which the pre-VGCF are struck against the inner peripheral wall of the container of the high-impact treatment apparatus) can appropriately be chosen in accordance with the fiber dimension, the desired aspect ratio, or the like, the velocity of the rotation of the impact blades may preferably be set to 40 meters per second, more preferably to 60 meters per second. The higher velocity can offer the better effect upon the fracture of the pre-VGCF. The operation of the apparatus at a velocity exceeding 100 meters per second may suffer from the disadvantages, however, that the apparatus should become larger in size due to the necessity of a protective device for safety measures, the way of operating the apparatus may become complex, and the operation may cause the economical inconvenience. The time required for the fracture of the pre-VGCF may appropriately be within 5 minutes and the longer treatment time is economically disadvantageous. It is to be noted herein that the velocity of the rotation of the rotatable impact blades is determined as the velocity at which their outermost ends of the impact blades rotate, because the velocity of the rotation at the outermost ends of the impact blades is the fastest and it can offer the greatest effect upon the fracture of the pre-VGCF.

The treatment by fracturing the pre-VGCF in the manner as described hereinabove can form the VGCF having the spin density of $8 \times 10^{18}$ spins/g or less, when measured by the electron spin resonance absorption method.

Decreasing of the spin density means decreasing an amount it of oxygen radical on a surface of VGCF.

Unclear is a reason why an amount of oxygen radical is decreased by the fracturing of pre-VGCF with high-impact and an amount of oxygen radical is not so decreased by graphitizing vapor-grown carbon fibers and fracturing. The inventors suppose that graphitizing causes the arranged graphite structure to generate carbon radicals and that these radicals react with air to form oxygen radicals after fracturing. Alternatively, it is supposed that generated oxygen radicals are changed to functional groups by fracturing and that functional graphitization of fractured vapor-grown carbon fibers by fracturing causes the generated functional group to decompose by pyrolysis.

It is supposed that the generated oxygen radicals exist mainly on the surface of fracturing section or cutting section through which lithium ion can enter VGCF in lithium secondary battery and therefore the oxygen radicals react with other compounds, for example solvents, to form solid electrolyte interface (SEI) which prevents lithium ion from entering the VGCF. Alternatively, it is supposed that because the functional groups formed from the oxygen radicals contribute to raising the affinity of VGCF to the matrix or another VGCF, VGCF having such functional groups can coagulate with each other and molded members of VGCF and composite members of VGCF can be formed with high packing density, good retentiveness of shapes, high impact strength and high thermal and electrical conductivity.

On the other hand, when the carbon fibers are fractured after the graphitization of the vapor-grown carbon fibers in accordance with the process of the present invention, the effects to be achieved by the present invention can be created because there exists a large number of the functional group on the fracture surfaces of the carbon fibers, which can work effectively with the matrix or the binder so that the VGCF are provided with a sufficient degree of wettability with the matrix or the binder.

c. Molded Members And Composite Members

The molded members according to the present invention consist or substantially solely of VGCF as described hereinabove. The molded members may contain a binder capable of binding the VGCF together in such an amount that does not adversely affect the objects of the present invention. The amount of the binder may be usually less than 20% by weight. The molded members can be formed and processed by molding or forming processes, for example, by hydrostatic pressure-isotropic pressure molding techniques, hot press method, cast film process with solvent and so on.

As the molded members consist solely or substantially of VGCF, all fibers of the VGCF come into contact with one another in the molded members, thereby imparting highly electrical and thermal conductivity. Further, the molded members consisting or substantially solely of the presently claimed VGCF can offer the advantage that they have superior characteristics as a carrier for a catalyst.

As the composite members according to the present invention, there may be mentioned, for example, composite materials and composite molded members, each consisting of the VGCF according to the present invention and the matrix.

The composite materials may include, for example, those which have the VGCF according to the present invention dispersed in the matrix such as a thermosetting resin and thermplastic resin. The composite molded members may include, for example, molded members consisting of the VGCF according to the present invention and the matrix. As the matrix to be used for the composite materials, there may be mentioned, for example, a resin such as the thermosetting resin, the thermoplastic resin, a metal, a rubber material, an adhesive composition, a paint composition, or the like. As the matrix to be used for the composite molded members, there may be used, for example, a resin, a metal, a rubbery material, or the like. The quantity of the VGCF according to the present invention to be used for the composite materials or the composite molded members may be usually 50% by weight or more with respect to the total weight of the composite members. As the composite materials can impart good properties to the molded state of the molded products and they can be densely packed at high VGCF fraction, the products such as paints and adhesives can provide the resulting film with a physically high strength, a high electrical conductivity, and a high thermal conductivity. The composite molded members can offer excellent processing characteristics that provide the processed surfaces with a beautiful finish, in addition to the characteristics that can be achieved by the composite materials. Hence, the composite members according to the present invention, such as the composite materials and the composite molded members, can be used as a high electrically and thermally conductive material, a carrier for a catalyst, or the Like.

The present invention will be described more in detail by way of examples. It should be understood herein that the present invention should not be interpreted in any respect to be limited to the examples as will be described hereinafter and that any modifications or changes should be encompassed within the spirit and the scope of the invention.

EXAMPLE 1

Vapor-grown carbon fibers having a mean fiber diameter of 0.8 $\mu$m, a mean fiber length of 132 $\mu$m and a mean aspect ratio of 165 were placed in an atmosphere in which argon gas is filled, and the carbon fibers were subjected to graphitization at 2,800° C. for 30 minutes. Thereafter, the resulting pre-VGCF were fractured by applying a high impact at 8,000 rpm (a peripheral speed: 100 meters per second) for 2 minutes with a high-impact treatment apparatus or a hybridizer (Model: NHS-1; K. K. Nara Kikai Seisakusho) while flowing gas at a high speed. After the fracture treatment, 100 fibers were chosen randomly for observation with a scanning electronmicroscope. As a result of the observation with the scanning electron microscope, it has been found that they had a mean fiber diameter of 0.8 $\mu$m, a mean fiber length of 8.4 μm, and a mean aspect ratio of 10.5. The fibers were then measured for a spin density in a magnetic field sweep range of 325.4±25 mT with an electron spin resonance measurement device (Model: JES-FE 3XG; Nippon Denshi K.K.). As a result, it was found that the fibers had an absorption peak at a spin density of 6.2×10$^{18}$ spins/g at g=2.015. When the treatment by the fracture was continued for 40 minutes, the absorption peak was reduced to a spin density of 1.5×10$^{18}$ spins/g.

After the pre-VGCF were subjected to the treatment by fracture for 2 minutes, they were mixed with a mixture of phenol resin and methanol so as to account for 60% by weight, 70% by weight, and 80% by weight, respectively, when translated into the percentage by weight after vaporization of methanol. Thereafter, bubbles present in the resulting mixture were removed and the mixture was coated on a glass plate, followed by drying at 80° C. for 10 minutes and then at 150° C. for 10 minutes to vaporize methanol and to become set. Then, a look of the coating was observed and a surface resistance thereof was measured. The results are shown in Table 1 below.

TABLE 1

| Rate of Carbon Fibers (% by weight) | Surface Resistance (Ω) | State of Coating |
| --- | --- | --- |
| 60 | 4.3 | ⊚ |
| 70 | 3.8 | ○ |
| 80 | 7.3 | ○ |

Notes:
"⊚" - State of coating sustained, high strength, and smooth surface
"○" - State of coating sustained, and ready for use.

Comparative Example 1

Vapor-grown carbon fibers having a mean fiber diameter of 0.8 μm, a mean fiber length of 132 μm and a mean aspect ratio of 165 were fractured by applying a high impact at 8,000 rpm for 2 minutes with a high-impact treatment apparatus or a hybridizer (Model: NHS-1; K. K. Nara Kikai Seisakusho), and the fractured carbon fibers were then placed in an atmosphere in which argon gas is filled and subjected to graphitization at 2,800° C. for 30 minutes. The resulting carbon fibers had a mean aspect ratio of 12. The resulting vapor-grown and graphitized carbon fibers were then measured for a spin density in the same manner as in Example 1. As a result, it was found that the fibers had an absorption peak at a spin density of 9.3×10$^{18}$ spins/g at g=2.015. When the treatment by the fracture was continued for 40 minutes, spin density was not found to have decreased to any large extent. Thereafter, the vapor-grown and graphitized carbon fibers were treated in substantially the same manner as in Example 1. The results are shown in Table 2 below.

TABLE 2

| Rate of Carbon Fibers (% by weight) | Surface Resistance (Ω) | State of Coating |
| --- | --- | --- |
| 60 | 11.2 | ○ |
| 70 | 17.2 | Δ |
| 80 | Not measurable | X |

Notes:
"○" - Form of coating sustained, and ready for use.
"Δ" - Form of coating sustained, yet the surface of the coating may break upon some operations
"X" - No form of coating sustained, the coating may break upon touch

EXAMPLE 2

Vapor-grown carbon fibers having a mean fiber diameter of 1.3 μm, a mean fiber length of 110 μm and a mean aspect ratio of 84.6 were placed in an atmosphere in which argon gas is filled, and the vapor-grown carbon fibers were subjected to graphitization at 2,500° C. for 20 minutes. Thereafter, the resulting pre-VGCF were fractured by applying a high impact at 7,200 rpm (a peripheral speed: 90 meters per second) for 2 minutes, with the high-impact treatment apparatus while flowing gas at a high speed. After the fracture treatment has been finished, 100 fibers were chosen randomly for observation with a scanning electron microscope. As a result of the observation with the scanning electron microscope, it has been found that they had a mean fiber diameter of 1.3 μm, a mean fiber length of 20 μm, a mean aspect ratio of 15.4, and a spin density of 5.9×10$^{18}$ spins/g at g=2.015. Thereafter, the VGCF were mixed with a polyethylene fine powder so as to account for 0.5% by weight and 10% by weight. The resulting mixture was packed into a rubber tube having an inner diameter of 25 mm and a length of 60 mm and the rubber tube was pressurized at 7,000 kg/cm$^2$ with a pressurizing machine (Model: BIP; Nikkiso K.K.) to form a molded member. The molded member was measured for its apparent density and a look of the molded member was observed. The results are shown in Table 3 below.

TABLE 3

| Rate of Binding Material (% by weight) | Apparent Density | State of Coating |
| --- | --- | --- |
| 0 | 1.54 | ○ |
| 5 | 1.79 | ⊚ |
| 10 | 1.84 | ⊚ |

Notes:
"⊚" - State of coating sustained, high strength, and smooth surface
"○" - State of coating sustained, and ready for use.

Comparative Example 2

The procedures in Example 2 were followed in the same manner, except for fracturing the pre-VGCF at a high impact While flowing gas at a high speed and then graphitizing it. The results are shown in Table 4 below. It is noted herein that the resulting VGCF had a mean aspect ratio of 17 and a spin density of 9.1×10$^{18}$ spins/g.

TABLE 4

| Rate of Binding Material (% by weight) | Apparent Density | State of Coating |
| --- | --- | --- |
| 0 | 1.16 | Δ |
| 5 | 1.22 | Δ |

TABLE 4-continued

| Rate of Binding Material (% by weight) | Apparent Density | State of Coating |
|---|---|---|
| 10 | 1.45 | ○ |

Notes:
"○" - State of coating sustained, and ready for use
"Δ" - State of coating sustained, yet the surface of the coating may break upon operations Comparative Example 3

The procedures in Example 2 were followed in the same manner, except for fracturing the vapor-grown carbon fibers at 2,000 rpm (a peripheral speed: 25 meters per second) while flowing gas at a high speed and then graphitizing it. It is noted herein that the resulting VGCF had a mean aspect ratio of 53 and a spin density of $9.3 \times 10^{18}$ spins/g. The results are shown in Table 4 below.

TABLE 5

| Rate of Binding Material (% by weight) | Apparent Density | State of Coating |
|---|---|---|
| 0 | — | X |
| 5 | — | X |
| 10 | 1.26 | Δ |

Notes:
"Δ" - State of coating sustained, yet the surface of the coating may break upon operations
"X" - No shape formed and coating may break upon touch

EXAMPLE 3

Carbon fibers grown in the vapor phase by the flow method and having a mean fiber diameter of 2.3 μm and a mean fiber length of 200 μm or larger were graphitized at 2,800° C. in argon gas. The resulting vapor-grown and graphitized carbon fibers were charged in the hybridizer and fractured at 8,000 rpm for 3 minutes. As a result, grown-in-the-vapor-phase and graphitized carbon fibers having a mean fiber diameter of 2.2 μm, a mean fiber length of 14.6 μm, and a spin density of $3.7 \times 10^{18}$ spins/g at g=2.015 were prepared.

On the other hand, a solution was prepared by placing 0.05 gram of polyvinylidene fluoride in an agate mortar and admixing it with 0.5 cc of 1-methyl-2-pyrrolidone.

To the resulting solution 0.95 gram of the grown-in-the-vapor-phase and graphitized carbon fibers prepared hereinabove were added and the mixture was stirred well to give a paste.

Then, an electrode was prepared by coating the resulting paste on a top of 10 mm×40 mm nickel mesh washed well with acetone so as to cover its area of 10 mm×10 mm surface of the nickel mesh, followed by drying the coating at 100° for 23 hours in vacuo.

A three-electrode cell was assembled with the resulting electrode in a glove box having an atmosphere in which the oxygen and water content were replenished sufficiently with argon gas. A 10 mm×40 mm×2 mm piece of metallic lithium was used as the counter electrode and the reference electrode. Further, as an electrolyte, there was used a solution prepared by dissolving $LiClO_4$ in a 1:1 mixture of ethylene carbonated and diethyl carbonate so as to have $LiClO_4$ at the concentration of 1 mole per liter.

Each of the electrodes was connected with a charge-discharge unit and allowed to stand until the voltage became constant. Thereafter, the charge and the discharge cycles between 0 V and 2.5 V of potential difference between the working electrode and the reference electrode were repeated. The results of up to three cycles are shown in Table 6 below.

Comparative Example 4

Carbon fibers and having a mean fiber diameter of 2.3 μm and a mean fiber length of 200 μm or larger grown in the vapor phase by the flow method were fractured with the hybridizer at 8,000 rpm for 3 minutes to thereby yield the carbon fibers, followed by carrying out the graphitization by heating the carbon fibers at 2,800° C. in argon gas. The resulting carbon fibers were found to have a mean fiber diameter of 2.2 μm, a mean fiber length of 18.3 μm, and a spin density of $9.3 \times 10^{18}$ spins/g at g=2.015. The grown-in-the-vapor-phase and graphitized carbon fibers were then formed into a three-electrode cell in the same manner as in Example 3. Table 6 below indicates the results up to three repetitions.

TABLE 6

| NO. OF CYCLES | CHARGE AMOUNT (mA Hr/g) | DISCHARG AMOUNT (mA Hr/g) | COULOMB EFFICIENCY(%) |
|---|---|---|---|
| EXAMPLE 3 | | | |
| 1 | 460 | 385 | 84 |
| 2 | 398 | 375 | 94 |
| 3 | 390 | 370 | 95 |
| COMPARATIVE EXAMPLE 4 | | | |
| 1 | 362 | 235 | 65 |
| 2 | 311 | 227 | 73 |
| 3 | 275 | 220 | 81 |

INDUSTRIAL APPLICABILITY

The VGCF according to the present invention are suitable for the preparation of the composite members such as composite materials, which are compounded at a high packing density with a plastic material, a rubbery material, a metallic material, a ceramic material, a paint composition, an adhesive composition, or the like, and composite molded members consisting solely or substantially solely of the VGCF fractured in accordance with the present invention, which may contain a small amount of a binding material.

The process for the preparation of the VGCF according to the present invention comprises subjecting the carbon fibers grown in the vapor phase to graphitization and then to fracturing them by applying a high impact thereto, thereby providing the VGCF with fractured faces wherein carbon on the surface of the fractured faces contains a lesser amount of oxygen radicals.

The molded members according to the present invention consist or substantially solely of VGCF so that the VGCF can be in contact with one another to such a sufficient extent that they are provided with remarkably high electrical and thermal conductivity. They can also be used appropriately as a carrier for a catalyst. The molded members are excellent in an electrode for a lithium ion secondary battery in which lithium forms intercalations with carbon.

The composite members according to the present invention can impart a good state to their molded products and contain the VGCF at a high packing density.

When the composite members according to the present invention are used as a paint or an adhesive, the resulting film can give a high strength film and a highly electrically and thermally conductive film. When the composite members are formed into the molded members, the resulting molded members can demonstrate superior processing characteristics such as imparting a beautiful finish to their processed surfaces, in addition to those properties as described hereinabove.

Hence, the molded members and the composite members according to the present invention can be employed as a material having a high degree of electrical and thermal conductivity and as a carrier for a catalyst.

We claim:

1. Vapor grown, graphitized and fractured carbon fibers having a mean fiber diameter of 5 μm or less, a mean fiber length of 90 μm or less, a mean aspect ratio of from 1 to 18, a spin density of $8 \times 10^{18}$ spins/g or less when measured by the electron spin resonance absorption method.

2. Vapor-grown and graphitized carbon fibers as claimed in claim 1, wherein said vapor-grown and graphitized carbon fibers have a mean fiber diameter ranging from 0.1 μm to 3 μm.

3. Vapor-grown and graphitized carbon fibers as claimed in claim 1, wherein said vapor-grown and graphitized carbon fibers have a mean fiber diameter ranging from 0.3 μm to 2 μm.

4. Vapor-grown and graphitized carbon fibers as claimed in claim 1, wherein said vapor-grown and graphitized carbon fibers have an aspect ratio of from 2 to 16.

5. Vapor-grown and graphitized carbon fibers as claimed in claim 1, wherein said vapor-grown and graphitized carbon fibers have an aspect ratio of from 5 to 15.

6. Vapor-grown and graphitized carbon fibers as claimed in claim 1, wherein said vapor-grown and graphitized carbon fibers have an interplanar distance ($d_{002}$) of a graphite lattice of 3.45 Å or less.

7. Vapor-grown and graphitized carbon fibers as claimed in claim 1, wherein said vapor-grown and graphitized carbon fibers have an interplanar distance ($d_{002}$) of a graphite lattice of from 3.35 Å to 3.42 Å.

8. Vapor-grown and graphitized carbon fibers as claimed in claim 1, wherein said vapor-grown and graphitized carbon fibers have an interplanar distance ($d_{002}$) of a graphite lattice of from 3.35 Å to 3.37 Å.

9. Vapor-grown and graphitized carbon fibers as claimed in claim 1, wherein said vapor-grown and graphitized carbon fibers have a thickness ($L_c$) of a laminated lattices in a crystal of 30 Å or thicker.

10. Vapor-grown and graphitized carbon fibers as claimed in claim 1, wherein said vapor-grown and graphitized carbon fibers have a thickness ($L_c$) of a laminated lattices in a crystal of 300 Å or thicker.

11. Vapor-grown and graphitized carbon fibers as claimed in claim 1, wherein said vapor-grown and graphitized carbon fibers have a thickness ($L_c$) of a laminated lattices in a crystal of 1,000 Å or thicker.

12. Vapor-grown and graphitized carbon fibers as claimed in claim 1, wherein said spin density is $7 \times 10^{18}$ spins/g or less when measured by the electron spin resonance absorption method.

* * * * *